United States Patent [19]

Schappler et al.

[11] Patent Number: 5,162,830
[45] Date of Patent: Nov. 10, 1992

[54] STYLUS ASSEMBLY FOR AUTOGRAPHIC CAMERA

[75] Inventors: Joseph J. Schappler, Bedford, N.H.; James E. Pickering, Holcomb, N.Y.

[73] Assignee: Eastman Kodak Company, Rochester, N.Y.

[21] Appl. No.: 773,760

[22] Filed: Oct. 15, 1991

Related U.S. Application Data

[63] Continuation of Ser. No. 594,879, Oct. 9, 1990.

[51] Int. Cl.⁵ ............................................. G03B 17/24
[52] U.S. Cl. ...................................... 354/106; 354/295
[58] Field of Search ..................... 354/105, 106, 295

[56] References Cited

U.S. PATENT DOCUMENTS

| | | | |
|---|---|---|---|
| 1,195,400 | 8/1916 | Robertson et al. | 354/106 |
| 1,217,653 | 2/1917 | Speidel | 354/106 |
| 1,259,152 | 3/1918 | Spangler et al. | 354/106 |
| 1,315,655 | 9/1919 | Brown | 354/106 |
| 1,894,021 | 1/1933 | Cornell | 354/106 |
| 4,020,492 | 4/1977 | Sumio | 354/106 |

Primary Examiner—Russell E. Adams
Assistant Examiner—Jae N. Noh
Attorney, Agent, or Firm—Roger A. Fields

[57] ABSTRACT

A stylus writing member is formed as part of a camera housing to avoid detracting from the camera's appearance. The writing member is coupled to a stylus by a universal joint which permits both rotational and pivotal movement of the writing member relative to the stylus.

23 Claims, 3 Drawing Sheets

STYLUS ASSEMBLY FOR AUTOGRAPHIC CAMERA

This is a continuation of application Ser. No. 07/594,879 filed Oct. 9, 1990.

TECHNICAL FIELD

This invention relates to autographic cameras and more particularly to a stylus assembly for recording information on a recording medium in such cameras.

BACKGROUND ART

Apparatus is known in the prior art for recording information on film during use of a photographic camera. Such apparatus typically records information on the film and simultaneously records information on a separate medium to produce a visible display of the information being recorded. U.S. Pat. Nos. 1,315,655; 1,195,400; 1,217,653; 1,259,152; and 4,020,492 are representative of such prior art.

To record information a stylus is generally provided which the user manipulates to write information on a medium to create a visual display of the information. By means of suitable optics and light emitting devices the information can be simultaneously recorded on the film.

The problem not solved by the prior art is the provision of such recording capability without substantially increasing the size and complexity of the camera. The stylus itself is a special problem. It is desirable to secure the stylus to the camera in some manner when it is not in use to avoid losing it. Attaching it to the outside of the camera as taught in the prior art tends to detract from the camera appearance. Storing it inside the camera such as behind a door increases the complexity and size of the camera.

DISCLOSURE OF INVENTION

It is an object of the present invention to provide a stylus assembly which is attached to the camera to prevent loss but does not significantly affect the camera's appearance or complexity.

In accordance with the invention a stylus writing member comprises part of the camera housing to avoid detracting from the camera's appearance. The writing member is coupled to the camera to be moveable to an operative writing position.

Another feature of the invention is the provision of a unique universal joint for coupling a writing member to a stylus which permits both rotational and pivotal movement of the writing member relative to the stylus.

DESCRIPTION OF THE DRAWINGS

Other objects and advantages of the invention will become apparent from the following description taken in connection with the accompanying drawings wherein.

MODE OF CARRYING OUT THE INVENTION

Figure 1:
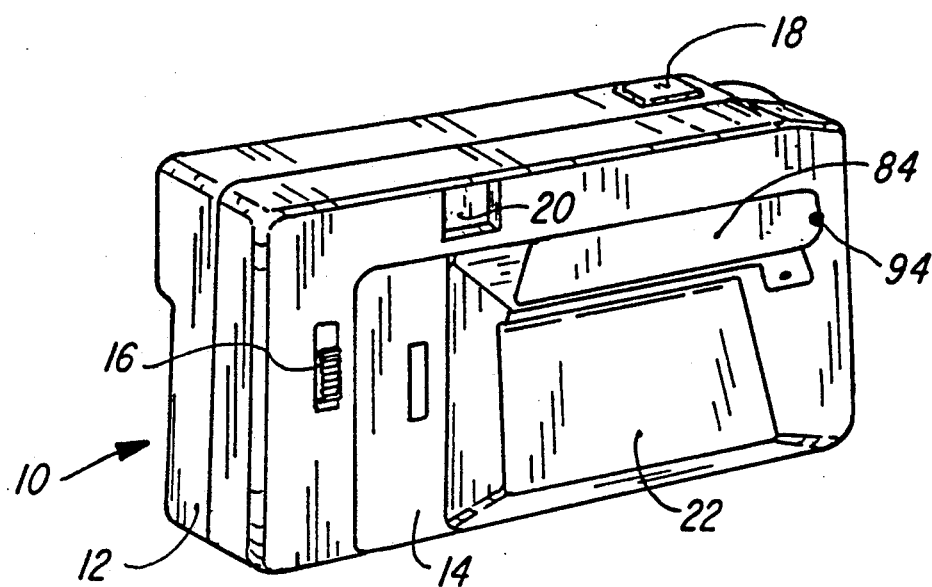
FIG. 1 is a perspective view of a camera incorporating the present invention.
Figure 2:
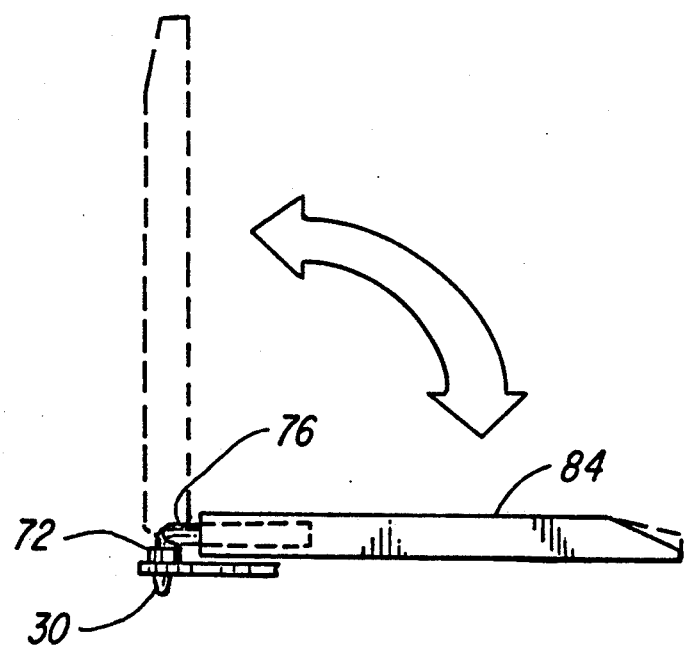
FIG. 2 is a side view illustrating the open and closed position of the writing member shown in FIG. 1.
Figure 3:
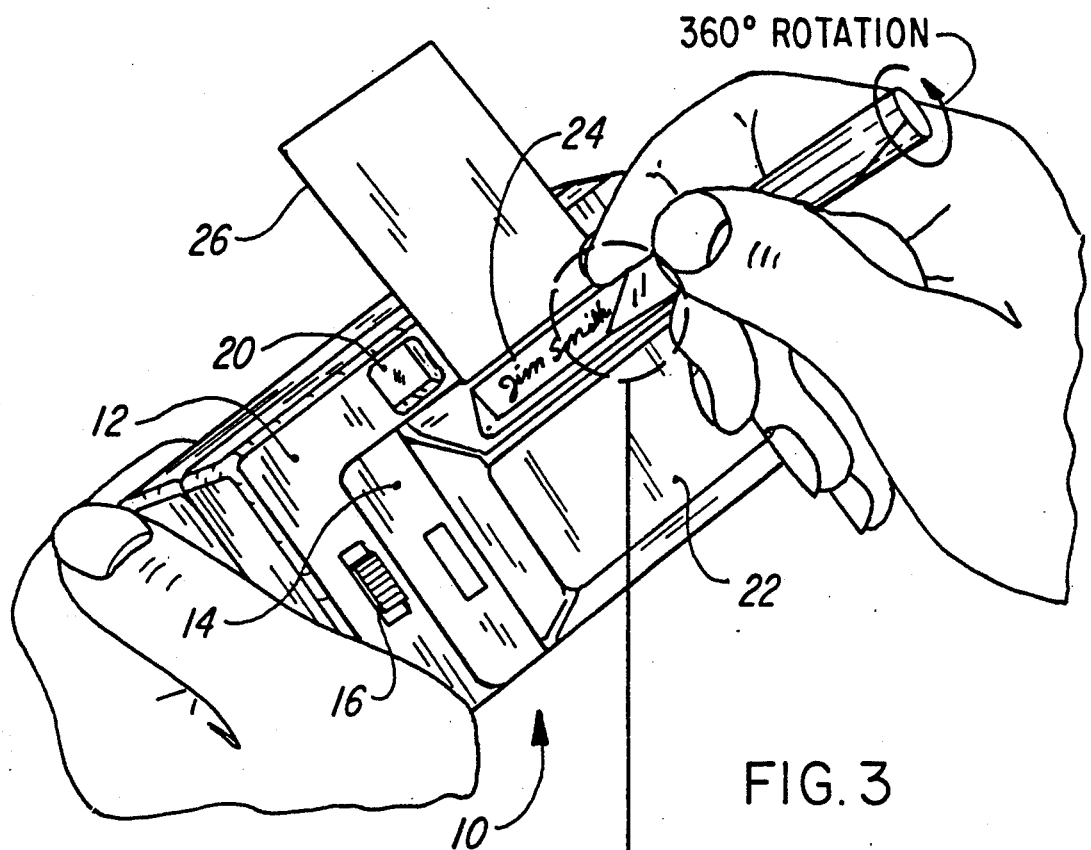
FIG. 3 is a perspective view similar to FIG. 1 illustrating use of the writing member.

Referring to FIGS. 1, 2 and 3 of the drawings there is shown a photographic camera generally identified by the reference numeral 10. The camera 10 may comprise a typical commercially available 35 mm camera having a housing 12, a rear door 14 for loading film into the camera, a door release button 16, a shutter release button 18, and a viewfinder window 20. The camera is also provided with a chamber in the rear door defined by an enlarged portion 22 of the door 14. The chamber defined by portion 22 houses the mechanism shown in FIG. 5 and described below.

In accordance with the invention the rear door 14 is provided with an elongated recessed window 24 (FIG. 3) in the upper part of surface 22. A recording medium such as a commercially available pressure sensitive writing paper 26 is received in the window 22 to enable the user to record information on that portion of the paper appearing in the window. The paper 26 may comprise a sheet of paper inserted manually into a slot (not shown) in the upper side of portion 22 and then advanced manually into the chamber behind portion 22. Alternatively the recording medium may comprise a paper roll from which paper is advanced automatically in synchronism with advancement of the film frames. Since the recording medium and associated parts form no part of the present invention further description is deemed unnecessary.

Figure 4:
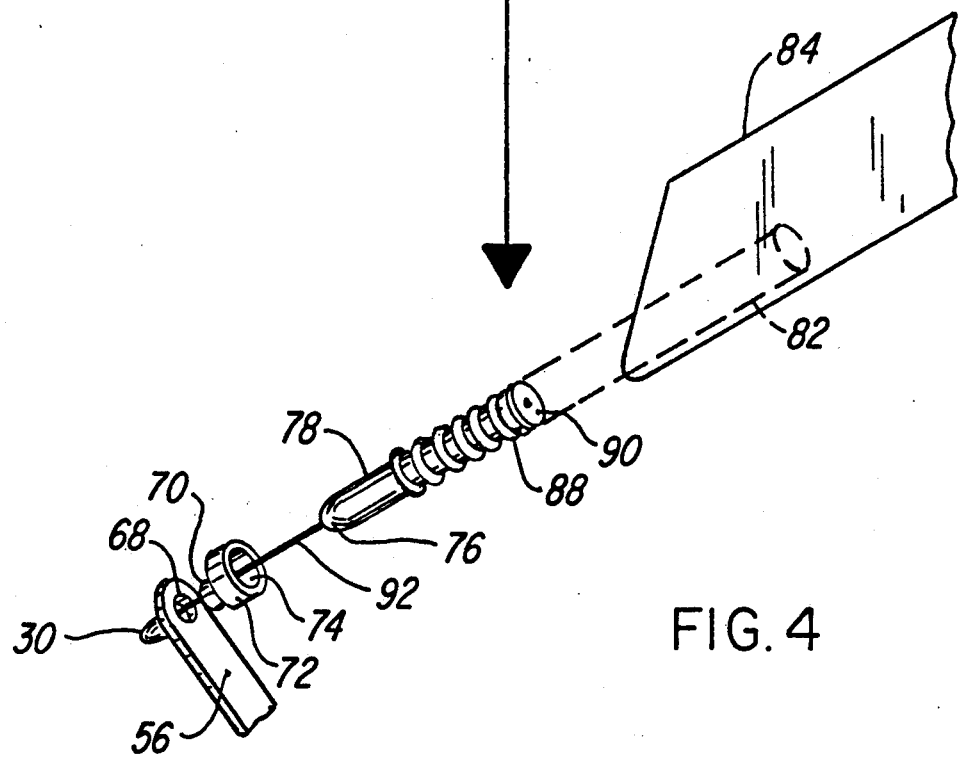
FIG. 4 is an exploded perspective view illustrating the writing member, stylus and associated parts.
Figure 5:
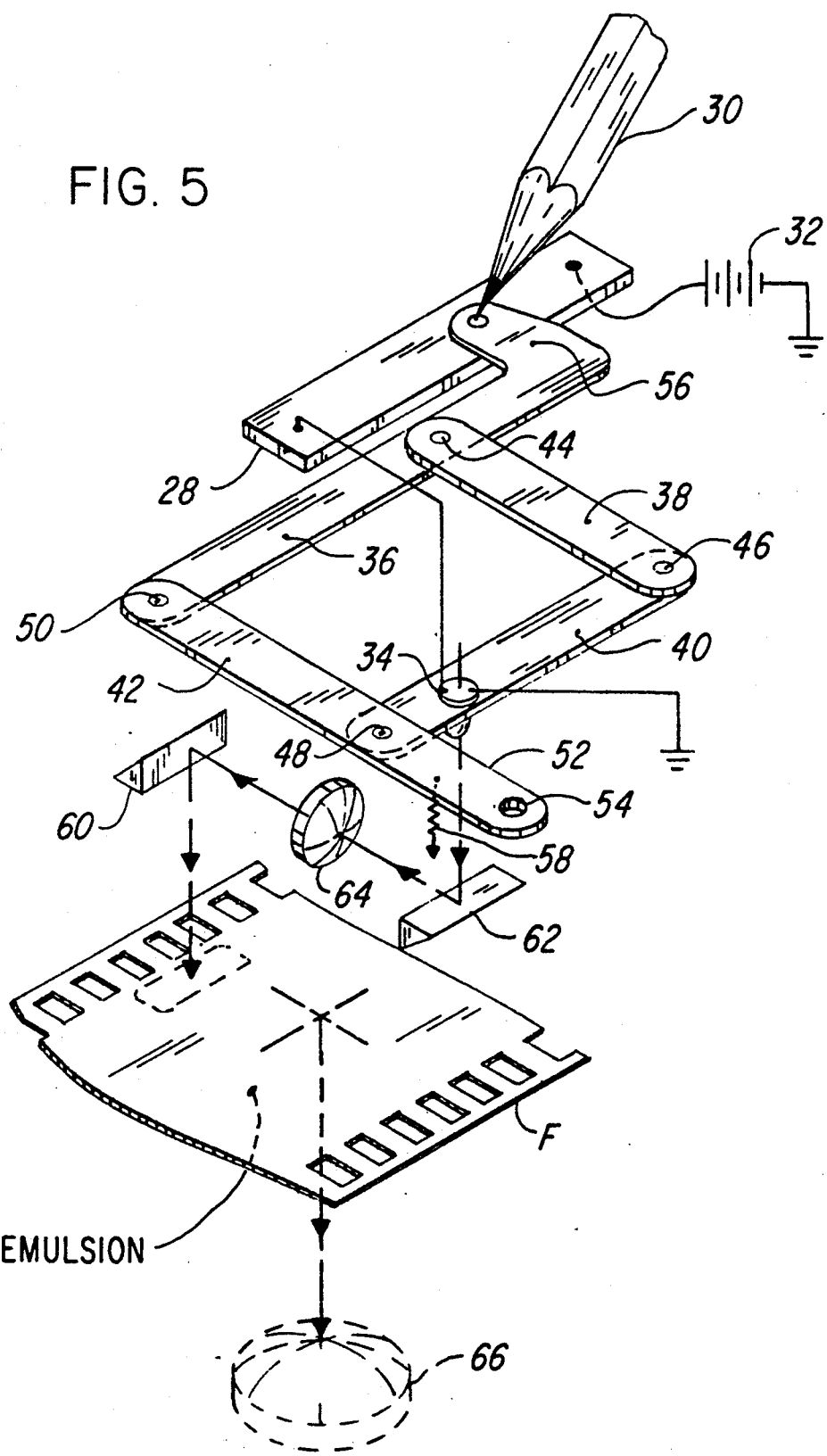
FIG. 5 is an exploded perspective view showing schematically the apparatus used in combination with the writing member and stylus for recording information simultaneously on a film.

Positioned below the window 24 in alignment therewith is an elongated paper support 28 (FIG. 5) which incorporates a pressure sensitive switch as indicated schematically in FIG. 5. To record information the paper is engaged by a movable stylus 30 (FIGS. 2 and 4) the structure of which will be described in more detail below. When pressure is applied to the stylus to record information the switch within support 28 will close to couple a power supply 32 to a light emitting diode 34 which will simultaneously record the information on a photographic film F within the camera.

A parallelogram linkage is provided to translate the motion of the stylus 30 into corresponding motion of the diode 34. The linkage comprises four arms 36, 38, 40 and 42 coupled in a parallelogram configuration by pivot pins 44, 46, 48 and 50 as shown in FIG. 5. An extension 52 of arm 42 is attached to a fixed pivot 54. The stylus 30 is mounted to the underside of an extension 56 of arm 36 and diode 34 is mounted on arm 40. A spring 58 is mounted between the arm extension 52 and the camera housing. Preferably the spring 58 biases the assembly to cause the stylus to engage the left end of window 24 when the system is not in use. When the system is in use the stylus can be moved over the paper against the bias of spring 58 with the motion of the stylus being translated by the parallelogram linkage into corresponding motion of the diode 34.

Light emitted by diode 34 is transmitted to the film F by means of a pair of prisms 60, 62 and a lens 64 to optically record information along the edge of a film frame exposed by the camera objective lens 66. Alternatively mirrors may be used instead of prisms.

In accordance with the invention the stylus 30 is actuated by means which forms part of the camera housing when not in use so as not to detract from the camera appearance. Referring more specifically to FIG. 4 the extension 56 of arm 36 is provided with a circular opening 68 axially aligned with the stylus 30. The opening 68 is sized to receive a projecting circular flange 70 of a ball shaped rotatable cup 72 having a rounded cup shaped recess 74 in its end opposite from the flange 70. The recess 74 is shaped to receive and provide a bearing surface for the rounded end portion of a stylus driving pin 78. The pin 78 has a lower cylindrical portion contiguous with the rounded end surface 76 which is adapted to be force fitted into a circular bore 82 of an elongated hand grippable writing member 84. The pin 78 has an upper cylindrical portion encircled by an elongated coil spring 88 having a washer 90 fixed to its upper end. The spring and washer are sized to be slidably received by the bore 82 whereby the washer can move relative to the pin 78 against the bias of the spring 88 to compress the latter. To complete the writing means assembly a cord 92 is threaded through an internal bore of the pin 78. The cord 92 has one end fixed to the washer 90 and its opposite end extending into opening 68 and attached to the stylus 30. The cord 92 may comprise a commercially available nylon "fish line" type of material commercially available from a number of manufacturers.

The cord 92 and spring 88 are sized so that when pin 78 is fixed within the end of base 82 the spring 88 will bias the washer 90 and cord 92 to urge the stylus into engagement with the rotating cup and the end portion 76 of pin 78 into engagement with the recess 74 of cup 72. The pressure applied by spring 88 is preferably adequate to maintain the parts in the axially aligned state shown in FIG. 4 and in dashed lines in FIG. 2. This position is the open and writing position of the writing member.

If it is desired to record information on the paper 26 and film F when the assembly is in the writing position the camera user merely grips the writing member 84 as shown in FIG. 3. The rotatable cup 72 and end portion 76 of pin 78 permit 360° of rotation of member 84 during writing. The resiliency of spring 82 and the surfaces of portion 76 and recess 74 permit pivotal movement of the member 84 in all directions relative to the stylus. The cup 72 and pin 78 thus provide a universal joint coupling the writing member to the stylus. However the stylus will move with the member 84 in the X and Y directions. Thus the member 84 may be manipulated as an ordinary writing pencil to record information on the paper and film.

Referring now to the unique storage feature of the invention the hand grippable writing member 84 is provided with a shape complemental in all dimensions to the interior configuration of the window 24 recess. Thus when the stylus 30 is in its rest position at the right side of the window the member 84 may be folded down against the bias of the spring 88 into the window recess to assume the closed position shown in FIGS. 1 and 2. This folding action is permitted by the pivot provided by the cup 72 and pin 78. When the hand grippable member is folded to its closed position the end surface of the member will engage a simple retention latch 94 which releasibly retains the member in its closed position. The latch 94 may comprise a simple resilient member on the edge of the window 24 which is frictionally engaged by the end surface of the writing member. The latch can be released by slight finger pressure to permit movement of the member 84 back to its open writing position.

When the hand grippable member 84 is in its closed position its exposed surface are contiguous and flush with the camera body surfaces as shown in FIG. 1. Thus the member does not detract from the camera's appearance.

It will now be apparent that the invention provides a simple low cost means for actuating a recording stylus. The recording means is attached to the stylus by means of the cord 92 to avoid loss. The unique universal joint provided by the parts permits writing in a normal manner and also permits folding of the writing member into the recess of the writing window to enhance the appearance of the camera.

Those skilled in the art to which the invention relates will appreciate that other substitutions and modifications can be made to the described embodiment without departing from the spirit and scope of the invention as described by the claims below.

We claim:

1. In a camera having a camera body adapted to receive a recording medium, the improvement comprising:
   a recess in the camera body adapted to receive the recording medium;
   a recording member; and
   means for pivotally supporting said writing member on the camera body whereby the writing member can be folded into said recess when not in use, said writing member having a surface flush and coextensive with a surface of the camera body when said writing member is folded into said recess so that said recording member surface forms part of the camera body surface.

2. In a camera as claimed in claim 1 further including a stylus for engaging said recording medium positioned in said recess over said recording medium, said pivotally supporting means pivotally coupling said writing member to said stylus.

3. In a camera as claimed in claim 2 wherein said pivotally supporting means comprises a universal joint for coupling said writing member to said stylus.

4. In a camera as claimed in claim 3 wherein said universal joint comprises a cup member having one end rotatably coupled to said stylus and defining a rounded recess in its other end, a pin fixed to said writing member and having a rounded end surface received by said rounded recess, said cup member permitting rotational and pivotal movement of said writing member relative to said stylus.

5. In a camera as claimed in claim 4 further including means for biasing said cup member into engagement with said stylus and said pin.

6. In a camera as claimed in claim 5 wherein said biasing means comprises a spring mounted on said pin, and a cord extending through said cup and connected between the end of said spring and said stylus.

7. In a camera as claimed in claim 5 or 6 wherein said biasing means retains said writing member in an upright writing position relative to the camera body, said biasing means being yieldable to permit movement of said writing member into said recess.

8. In a camera as claimed in claim 7 further including latch means for latching said writing member in said recess.

9. In a camera having a camera body and means for receiving a recording medium, the improvement comprising;
   a stylus in the camera body for engaging the recording medium and movable relative to the recording medium;

an elongated writing member; and a universal joint for pivotally and rotatably coupling said writing member to said stylus whereby said writing member can be manipulated by a camera user to cause said stylus to record information on said recording medium, said universal joint comprising a cup member having one end rotatably coupled to said stylus and defining a rounded recess in its other end, a pin fixed to said writing member and having a rounded end surface received by said rounded recess, said cup member permitting rotational and pivotal movement of said writing member relative to said stylus.

10. In a camera as claimed in claim 9 further including means for biasing said cup member into engagement with said stylus and said pin.

11. In a camera as claimed in claim 10 wherein said biasing means comprises a spring mounted on said pin, and a cord extending through said cup and connected between the end of said spring and said stylus.

12. In a camera as claimed in claim 10 and 11 wherein said biasing means retains said writing member in an upright writing position relative to the camera body, said biasing means being yieldable to permit manipulation of said writing member.

13. In a camera having a camera body adapted to receive a recording medium and having means for recording information on the recording medium, the improvement comprising;

an elongated writing member;

an elongated recess in the camera body for receiving said writing member in an orientation such that one surface of said writing member is exposed to the exterior of the camera body, said writing member and said recess having complemental dimensions whereby when said writing member is received in said recess its exposed surface is substantially flush and coextensive with the exterior surface of the camera body so that said exposed surface of said writing member forms part of the exterior surface of the camera body; and means for pivotally coupling said writing member to the recording means, said pivotal coupling means permitting pivotal movement of said writing member out of said recess to a writing position.

14. In a camera as claimed in claim 13 wherein said pivotal coupling means comprises a universal joint for coupling one end of said writing member to the recording means.

15. In a camera as claimed in claim 14 wherein the recording means comprises a recording stylus and said universal joint couples said writing member to said stylus.

16. In a camera as claimed in claim 15 wherein the improvement further comprises a cord attached to said writing member and said stylus, said cord extending through said universal joint.

17. In a camera as claimed in claim 16 wherein the improvement further comprises biasing means for biasing said writing member and said stylus into engagement with said universal joint.

18. In a camera having a camera body adapted to receive a recording medium and having means for recording information on the recording medium, the improvement comprising;

an elongated recess in the exterior surface of the camera body;

an elongated writing member having dimensions complemental to the dimensions of said recess positioned in said recess, said writing member having a surface flush and coextensive with the exterior surface of the camera body whereby said surface of the writing member forms part of the exterior surface of the camera body so that the presence of said writing member does not distract from the exterior appearance of the camera; and means for pivotally coupling said writing member to the recording means, said pivotal coupling means permitting pivotal movement of said writing member out of said recess to a writing position.

19. In a camera as claimed in claim 18 wherein said pivotal coupling means comprises a universal joint for coupling one end of said writing member to the reocrding means.

20. In a camera as claimed in claim 19 wherein the recording means comprises a recording stylus and said universal joint couples said writing member to said stylus.

21. In a camera as claimed in claim 20 wherein the improvement further comprises a cord attached to said writing member and said stylus, said cord extending through said universal joint.

22. In a camera as claimed in claim 21 wherein the improvement further comprises biasing means for biasing said writing member and said stylus into engagement with said universal joint.

23. In a camera having a camera body adapted to receive a recording medium, the improvement comprising:

a writing member having a surface complemental to the exterior surface of the camera body; and means for pivotally supporting said writing member on the camera body whereby the writing member can be folded into the camera body with said writing member surface flush and coextensive with the camera body exterior surface so that said writing member surface forms part of the camera body exterior surface.

* * * * *